(12) United States Patent
Kubik

(10) Patent No.: US 6,652,689 B2
(45) Date of Patent: Nov. 25, 2003

(54) PROCESS AND DEVICE FOR ULTRASOUND TREATMENT OF A STRIP OF MATERIAL

(75) Inventor: Klaus Kubik, Tönisvorst (DE)

(73) Assignee: Eduard Kusters Maschinenfabrik GmbH, Krefeld (DE)

( * ) Notice: Subject to any disclaimer, the term of this patent is extended or adjusted under 35 U.S.C. 154(b) by 27 days.

(21) Appl. No.: 10/103,250

(22) Filed: Mar. 21, 2002

(65) Prior Publication Data

US 2002/0166717 A1 Nov. 14, 2002

(30) Foreign Application Priority Data

Mar. 21, 2001 (DE) .......................................... 101 13 862

(51) Int. Cl.⁷ .............................................. B29C 65/08
(52) U.S. Cl. ..................... 156/73.1; 156/498; 156/580.1
(58) Field of Search .......................... 156/64, 73.1, 359, 156/498, 580.1, 580.2, 581, 582; 264/442, 443, 445

(56) References Cited

U.S. PATENT DOCUMENTS 4,605,454 A  *  8/1986  Sayovitz et al. ............ 156/73.1
5,059,277 A  * 10/1991  Willhite, Jr. et al. ..... 156/580.1
5,840,154 A  * 11/1998  Wittmaier .................. 156/580.2
5,879,494 A  *  3/1999  Hoff et al. ................... 156/73.3
6,004,427 A  * 12/1999  Kohn ......................... 156/580.2
6,120,629 A  *  9/2000  Shannon et al. ............ 156/73.1
6,471,804 B1 * 10/2002  Tennby et al. .............. 156/73.1

FOREIGN PATENT DOCUMENTS

DE       195 13 246    4/1996

* cited by examiner

*Primary Examiner*—James Sells
(74) *Attorney, Agent, or Firm*—Kenyon & Kenyon

(57) ABSTRACT

A process for ultrasound treatment of a strip of material and a device for implementing such a process. A strip of material passes through a treatment gap, which is formed by a roller device that includes a rotating roller body and a sonotrode that is directed approximately radially against the working surface of the roller body. In order to at least extensively prevent any concentricity defect of the roller body that might result from bending of the roller body, the roller body is cooled directly below the working surface of the roller body. For this purpose, the roller body has a number of lengthwise bores distributed uniformly over the circumference, preferably on an arc, through which a cooling medium flows in essentially uniform manner.

12 Claims, 2 Drawing Sheets

PROCESS AND DEVICE FOR ULTRASOUND TREATMENT OF A STRIP OF MATERIAL

FIELD OF THE INVENTION

The invention relates to a process for ultrasound treatment of a strip of material, and to a device for implementing the process.

BACKGROUND OF THE INVENTION

An ultrasound treatment system for treatment of a strip of material, in which the strip of material passes through a treatment gap, which is formed by a roller device that includes a rotating roller body and a sonotrode directed approximately radially against the working surface of the roller body, is known from German Patent 195 13 246 C2. In such systems, special requirements concerning the concentricity of the roller are set, in order to ensure uniform quality of the strip of material after the treatment.

This is particularly true for ultrasound bonding of nonwoven fabrics made of thermoplastic fibers. Here, the ultrasound generator is radially placed against the counter-roller via a sonotrode, i.e. the transmitter of the ultrasound, and the counter-roller generally bears a bonding pattern in the form of a surface engraving. At the raised locations of the surface engraving, the transfer of ultrasound energy to the nonwoven fabric is particularly intensive, so that here, a preferential temperature increase and preferential melting of the fibers occur, and in this manner, bonding of the individual filaments or fibers of the nonwoven fabric, following a pattern, at certain points or along certain lines, takes place, thereby bonding the layer of nonwoven fabric in and of itself. Furthermore, laminates, i.e. laminate materials made up of films and nonwoven fabrics, can also be produced in this manner.

Preferably, the sonotrode is rigidly connected with the roller device, since this makes it possible to introduce a maximum amount of energy into the strip of material passing through. "Rigidly" means that the sonotrode is affixed to the machine frame, which also carries the roller device, without the insertion of any resilient element.

When using such devices for ultrasound treatment of a strip of material, it has been shown, in the past, that at first, very good treatment results are obtained. However, after the speed or the amount of energy introduced is increased, the work result deteriorates, because the roller body of the roller device starts to bend. This effect particularly occurs if there are fundamental concentricity defects. Any bending that has come about will cause the gap that is formed between the working surface of the roller body and the sonotrode to become larger and smaller with the cycle of rotation of the roller body. When the gap is smaller, more energy flows into the bonding process, and the roller body will become warmer at this location. This will cause it to expand further, resulting in further reinforcement of the bending effect, until this bending has reached such an extent that ultrasound treatment becomes impossible.

OBJECTS OF THE INVENTION

The invention is therefore based on the task of developing a process and a device for ultrasound treatment of a strip of material, in which any bending of the roller body is at least significantly reduced, even when a high amount of energy is introduced by the sonotrode, and, particularly, even if the sonotrode is rigidly connected with the roller device.

This task is accomplished with a process for ultrasound treatment of a strip of material, comprising:

passing the strip of material through a treatment gap, the gap formed by a roller device that includes a rotating roller body and a sonotrode directed approximately radially against a working surface of the roller body; and cooling the roller body, approximately uniformly over its circumference, directly below the working surface of the roller body.

The task is further accomplished with a device for ultrasound treatment of a strip material, comprising:

a roller device that includes a rotating roller body, and a treatment gap formed by a sonotrode directed approximately radially against a working surface of the roller body, wherein a cooling device for cooling the roller body is provided directly below the working surface of the roller body.

Surprisingly it has been shown that the concentricity defect can be significantly reduced, even if introduction of energy by the sonotrode is at a high level, and can regularly be reduced to values as low as <5 μm, if the roller body is cooled directly below its working surface. "Directly" in this connection is to be understood to mean that the roller mantle has a wall thickness, in the direction towards the axis of rotation of the roller, that is at least twice, preferably at least five times as great as the wall thickness of the cooled, outside region of the roller body that forms the working surface. The improvement in the concentricity defect when using the process according to the present invention can be explained by the fact that the heat introduced is conducted away directly below the working surface, so that the remainder of the material of the roller cross-section remains at a uniform temperature even at angle positions in which a greater amount of energy is introduced, and therefore counteracts the bending on the basis of thermal, unilateral expansion. Since, according to the present invention, the region at a uniform temperature has a greater wall thickness than the outer region that might be heated more strongly locally, it counteracts any bending of the roller body.

Cooling of the roller body directly below the working surface preferably takes place in that a fluid cooling medium is passed through cooling channels that are distributed uniformly over the circumference of the roller body and arranged directly below the working surface of the roller body.

It is particularly preferred if the fluid cooling medium is passed through lengthwise bores that run directly below the working surface, approximately parallel to the latter.

In order to prevent the cooling medium from flowing along a preferred path, characterized by the lowest flow resistance, due to different flow cross-sections, for example, the cooling medium is preferably passed through the cooling channels at such a speed that turbulent flow prevails in them.

Experiments have shown that the best treatment results are achieved if the roller body is temperature-controlled in its interior, i.e. in its region that extends radially in the direction towards the axis of rotation of the roller body, away from the cooling means, and, preferably, if the temperature difference between the working surface of the roller body and the cooling medium is a maximum of 2° C.

The device according to the present invention, for ultrasound treatment of a strip of material according to the process according to the present invention, therefore has means for cooling the roller body located directly below the working surface of the roller body.

These are preferably formed by cooling channels that are distributed uniformly over the circumference of the roller body and arranged directly below the working surface of the roller body.

The means for cooling are comparatively simple to produce and very effective if they are made up of lengthwise bores that are arranged approximately parallel to the working surface of the roller body.

They are preferably structured in such a way, for reasons already indicated above, that when the cooling medium flows through them, turbulent flow prevails in them.

The roller body of the roller arrangement furthermore preferably has means for temperature control of the roller body, which keep the region that lies between the means for cooling the roller surface and the axis of rotation of the roller body at a uniform temperature. The means for temperature control can be electrically operated heating means, for example electric heating rods.

Because the amount of energy that can be introduced into the strip of material that passes through the roller gap in this way is so high, it is especially preferred if the sonotrode is rigidly connected with the roller device, i.e. without the insertion of any elastic elements.

DETAILED DESCRIPTION OF THE DRAWINGS

Figure 1:
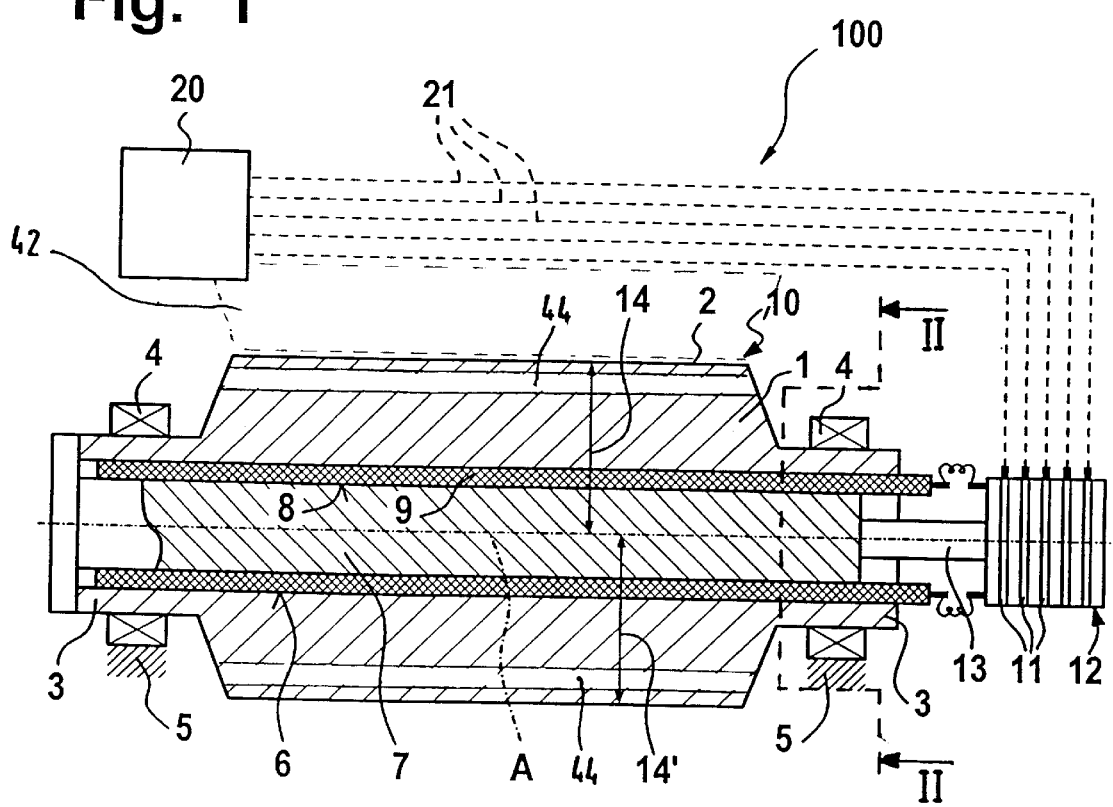
FIG. 1 illustrates a longitudinal cross-section through a preferred embodiment of the device according to the present invention.

The device, designated as a whole as 100 in FIG. 1, for ultrasound treatment of a strip of material, includes a roller device 10 with a roller body 1, which has a cylindrical circumference surface, forming working surface 2, the width of which is determined by the width of strip of material 40 (see FIG. 2) to be treated.

Roller body 1 has axially projecting roller journals 3 at both ends, on which it is mounted to rotate in a machine frame 5, not shown in its entirety, via bearings 4, around axis A, which is coaxial with working surface 2. Roller device 10 forms the counter-roller of the ultrasound treatment system, and is usually engraved.

In the production of roller device 10, the greatest possible accuracy was aimed at, in terms of treatment technology. However, a certain amount of residual concentricity defect is unavoidable and actually escalates for the reasons described above, because heat will be preferentially introduced on the side that is closest to the sonotrode, and roller body 1 will heat up on one side, and this will result in causing the roller body to bend in a plane that passes through its axis A.

In its interior, roller body 1 has a cylindrical recess 6 that is coaxial to axis A and passes entirely through the roller body, in which a cylindrical core 7 that matches the recess in diameter is inserted, which core essentially extends over the length of roller body 1.

On its outside circumference, core 7 has axis-parallel grooves 8 that pass over its entire length, in which rod-like electric heating elements 9 are arranged, which extend approximately over the length of roller body 1, and are connected on the right end in FIG. 1 with slip rings 11 of a slip ring head designated as a whole as 12. Each heating element 9 can be separately supplied with electrical energy, independent of the other heating elements 9 that might be present. The electrical energy is passed to the individual slip rings 11 by a control device 20, via lines 21. Slip ring head 12 is seated on an extension journal 13 of core 7 that projects out of the right end of roller 10 in FIG. 1.

Heating elements 9 serve for temperature control of roller body 1.

Figure 2:
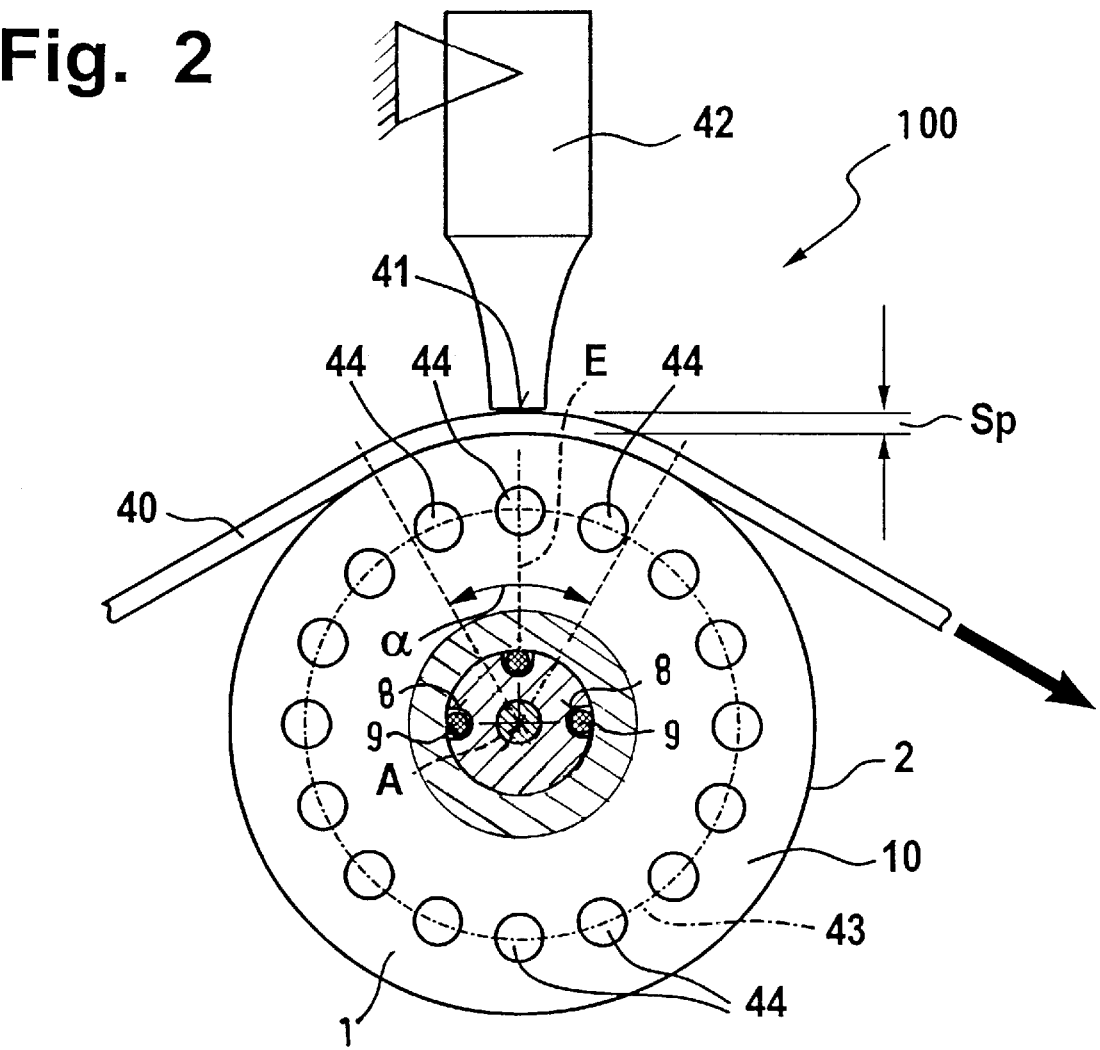
FIG. 2 illustrates in schematic form, a side view of the same device, partially in cross-section along line II—II.

As is particularly evident from FIG. 2, in which sonotrode 42, which delimits the treatment gap on one side, is more clearly evident than in FIG. 1, in which it was merely indicated in general, for the sake of simplicity, strip of material 40 is passed through gap Sp between face 41 of sonotrode (or sonotrodes) 42 and working surface 2 of roller body 1, and there it is subjected to the ultrasound effect. Roller body 1 has a number of peripheral lengthwise bores, uniformly distributed over the circumference, over an arc 43, through which a fluid cooling medium can be passed in the direction of roller axis A. In the exemplary embodiment shown, the fluid cooling medium is a cooling fluid that is passed through all of peripheral bores 44 at the same time, at a speed such that turbulent flow of the cooling fluid prevails in the peripheral bores, in order to thereby reduce the effect of different flow resistances on the uniformity of the amount of cooling fluid that flows through lengthwise bores 44.

While the foregoing description and drawings represent the preferred embodiments of the present invention, it will be apparent to whose skilled in the art that various changes and modifications may be made therein without departing from the true spirit and scope of the present invention.

What is claimed is:

1. A process for ultrasound treatment of a strip of material, comprising:

passing the strip of material through a treatment gap, the gap formed by a roller device that includes a rotating roller body and a sonotrode directed approximately radially against a working surface of the roller body; and cooling the roller body, approximately uniformly over its circumference, directly below the working surface of the roller body.

2. The process according to claim 1, further comprising the step of:

passing a fluid cooling medium through cooling channels distributed approximately uniformly over the circumference of the roller body, directly below the working surface of the roller body.

3. The process according to claim 2, further comprising the step of:

passing the fluid cooling medium through lengthwise bores that run directly below the working surface, approximately parallel to the working surface.

4. The process according to claim 2, wherein the passing step comprises passing the fluid cooling medium through the cooling channels at a predetermined speed so that a turbulent flow of the cooling medium prevails in the cooling channels.

5. The process according to claim 1, wherein an interior of the roller body is temperature-controlled.

6. The process according claim 2, wherein a temperature difference between the working surface of the roller body and the cooling medium is a maximum of 2° C.

7. A device for ultrasound treatment of a strip material, comprising:

a roller device that includes a rotating roller body, and a treatment gap formed by a sonotrode directed approximately radially against a working surface of the roller body, wherein a cooling device for cooling the roller body is provided directly below the working surface of the roller body.

8. The device according to claim 7, wherein the roller body has cooling channels disposed approximately uniformly over a circumference of the roller body, the channels directly below the working surface.

9. The device according to claim 8, wherein the cooling channels are lengthwise bores configured approximately in parallel to the working surface of the roller body.

10. The device according to claim 8, wherein the cooling channels are configured so that when the cooling medium flows through the channels, turbulent flow prevails in the channels.

11. The device according to claim 7, further comprising a temperature control device for controlling the temperature of the roller body, the temperature control device provided between the cooling device and the roller surface and the center axis of the roller body.

12. The device according to claim 11, wherein the sonotrode is rigidly connected to the roller device.

* * * * *